US012729020B2

(12) United States Patent
Knopf et al.

(10) Patent No.: US 12,729,020 B2
(45) Date of Patent: Sep. 8, 2026

(54) DRONE NETWORK AND SYSTEM WITH A DRONE NETWORK

(71) Applicant: IDAS GmbH—Intelligent Drone Application Systems, Achern (DE)

(72) Inventors: Martin Knopf, Achern (DE); Fredy Doll, Achern (DE); Pascal Doll, Achern (DE)

(73) Assignee: IDAS GmbH—Intelligent Drone Application Systems, Achern (DE)

( * ) Notice: Subject to any disclaimer, the term of this patent is extended or adjusted under 35 U.S.C. 154(b) by 0 days.

(21) Appl. No.: 19/215,633

(22) Filed: May 22, 2025

(65) Prior Publication Data

US 2025/0368360 A1 Dec. 4, 2025

(30) Foreign Application Priority Data

May 23, 2024 (DE) ........................ 102024114417.3

(51) Int. Cl.

| | |
|---|---|
| ***B64U 10/60*** | (2023.01) |
| ***B64U 50/30*** | (2023.01) |
| *B64C 39/02* | (2023.01) |

(52) U.S. Cl.

CPC ............. *B64U 10/60* (2023.01); *B64U 50/30* (2023.01); *B64C 39/022* (2013.01)

(58) Field of Classification Search

CPC ........ B64U 10/60; B64U 50/30; B64C 39/022

See application file for complete search history.

(56) References Cited

U.S. PATENT DOCUMENTS

| | | | | |
|---|---|---|---|---|
| 9,630,712 | B1 * | 4/2017 | Carmack | B64U 50/13 |
| 10,195,629 | B1 * | 2/2019 | Dahlstrom | B05B 13/005 |
| 2013/0233964 | A1 * | 9/2013 | Woodworth | B64U 10/60 244/175 |
| 2015/0274294 | A1 * | 10/2015 | Dahlstrom | B05B 13/0278 239/722 |
| 2017/0043872 | A1 * | 2/2017 | Whitaker | B64C 27/00 |
| 2021/0155344 | A1 * | 5/2021 | Mura Yañez | E04B 1/35 |

FOREIGN PATENT DOCUMENTS

| | | | | |
|---|---|---|---|---|
| DE | 112017007274 B4 | 10/2024 | | |
| DE | 102019208630 B4 | 12/2024 | | |
| JP | 2019206233 A | 12/2019 | | |
| JP | 2019206235 A | 12/2019 | | |
| WO | WO-2020249447 A1 * | 12/2020 | | B64U 70/20 |

* cited by examiner

*Primary Examiner* — Tye William Abell

(74) *Attorney, Agent, or Firm* — Volpe Koenig

(57) ABSTRACT

A drone network (1) having at least three drones, with at least one first work drone (2), the work drone (2) being designed to perform activities in its environment and being connected to a base station (5) via a supply line (4), and having at least one auxiliary drone (3), with the supply line (4) being guided to the work drone (2) via the auxiliary drone (3). The drone network additionally includes a further, third drone (14) which has sensors (8) and/or monitors (9) for monitoring the work drone (2) and/or auxiliary drone (3) and/or monitors (9) for monitoring the environment of the work drone (2) and/or auxiliary drone (3). A system (13) is also provided having a drone network (1) and a base station (5).

20 Claims, 1 Drawing Sheet

DRONE NETWORK AND SYSTEM WITH A DRONE NETWORK

CROSS-REFERENCE TO RELATED APPLICATIONS

This application claims priority from German Patent Application No. 10 2024 114 417.3, filed May 23, 2024, which is incorporated herein by reference as if fully set forth.

TECHNICAL FIELD

The invention relates to a drone network and to a system including a drone network.

BACKGROUND

Unmanned flying drones are usually remotely controlled or autonomously operated flying machines and are used for various applications. A common embodiment is presented by what are known as multicopters. A multicopter is a flying machine which is driven by several rotor units, the rotors of which are arranged in a common rotor plane. Flying drones of this kind are controlled by adjusting the speeds and directions of rotation of the rotors. As a result, it is possible to adjust any desired rotations about the yaw, pitch or roll axis of the flying drone or, for example, to initiate hovering, climbing or descending flight.

Due to their good maneuverability, flying drones of this kind are taken into consideration for a large number of different applications, it being possible to equip the flying drone in particular with different effectors, that is to say tools, application apparatuses or sensors for example, which interact with the environment of the flying drone. However, the applications are usually limited by the fact that the flying drone can carry only a certain load and has a flight duration which is limited by a battery. Due to climbing and descending, usually only a short time remains for carrying out corresponding work or making corresponding recordings. Specifically, in the case of application apparatuses in which an application medium is dispensed, only small quantities can be transported by the drone on account of the load and the load distribution, as a result of which the application process has to be interrupted several times in the case of relatively large projects. It is therefore known that corresponding drones are equipped with supply lines which are intended to extend usage duration of the flying drones for use. However, one disadvantage of such systems is that the supply line leads to an additional load on the drone which, depending on the point of action on the drone, additionally generates an unbalance and leads to a shift in the center of gravity. As a result, it is considerably more difficult to control the drone.

SUMMARY

One object is therefore to specify a drone network and a system with a drone network which improve the intended use of a drone. A further object is to ensure supply to the work drone and at the same time ensure good maneuverability of the work drone.

These and further objects are achieved by a drone network and a system having one or more of the features disclosed herein. Advantageous refinements of the drone network are described below and int eh claims. Advantageous refinements of the system are also presented below and in the claims.

The drone network according to the invention comprises at least two drones, comprising at least one first work drone, the work drone being designed to perform activities in its environment and being connected to a base station via a supply line, and at least one auxiliary drone, the supply line being guided to the work drone via the auxiliary drone. The drone network according to the invention further comprises a further, third drone which comprises sensors and/or means for monitoring the work drone and/or auxiliary drone and/or means for monitoring the environment of the work drone and/or auxiliary drone.

Guiding the supply line via the auxiliary drone substantially reduces tensile loading on the work drone, as a result of which the work drone can be controlled more effectively and more easily. In addition, the flexibility of the work drone is increased since it can be moved more freely, without the movement being directly restricted by a supply line. The freedom of movement of the work drone is therefore increased. Overall, use of the work drone is made easier with the supply to the work drone via the supply line being ensured at the same time.

The flexibility is increased by a further drone since a specific task is assigned to each drone. In particular during monitoring and for sensor measurements, it may be necessary for this drone to require a greater radius of movement which, in the case of the auxiliary drone and the work drone, cannot always be ensured owing to the connection to the supply line. Even during detection and documentation while carrying out work, a further, third drone, which is not connected to the supply line or is operatively connected to the supply line, can move more freely. The further drone is preferably independent of the work drone and the auxiliary drone, in particular free of a supply line which is connected to the work drone and/or the auxiliary drone. However, as an alternative, the further drone can also be connected to a supply line, in particular to be supplied with power. This supply line can be guided via the auxiliary drone, in particular via the auxiliary drone connected to the work drone or connected directly to the further drone. The supply line for the further drone can preferably also be guided via an auxiliary drone assigned only to the further drone.

The monitoring means may be, in particular, a monitoring unit. The monitoring means, in particular the monitoring unit, may be a camera, for example. The at least one sensor may be, for example, an optical, acoustic, magnetic or electrical sensor. The at least one sensor can also be designed or used for monitoring purposes and in particular can also be considered to be a monitoring means.

The further drone may be, in particular, a monitoring drone.

In an advantageous embodiment, the work drone is substantially free of tensile loading by the supply line or by a weight force of the supply line. The weight of the supply line, which can be several tens of meters long, is placed on the auxiliary drone and specifically no longer on the work drone owing to the drone network according to the invention. This further improves the maneuverability of the work drone and also increases the freedom of movement.

According to a preferred embodiment, the supply line is a power line and/or a data line. The work drone and also the auxiliary drone can be permanently supplied with energy via the power line, so that relatively long usage times of the work drone and the auxiliary drone are possible. Information can be directly transmitted to the work drone and the auxiliary drone via the data line, so that secure and permanent communication with the at least two drones is possible.

As an alternative or preferably in addition, the supply line is a transport line for a medium. The medium is preferably a solid, liquid, pasty and/or gaseous medium. The medium is preferably water, a cleaning agent, a cleaning medium or compressed air. Supply of a medium, which is required by the work drone, to the work drone can also be ensured via the supply line. As a result, the work drone can remain in the air for longer and does not have to be returned to a base or the base station for refilling the medium.

In a further advantageous embodiment, the work drone comprises at least one applicator for applying an application medium to an object. The object may be, in particular, a physical object, in particular a building. Here, the application and the application medium depend on the respective intended use. Therefore, the application medium may be, for example, a cleaning medium, a coating agent, in particular a paint or a lacquer, or a filling medium, in particular a foam. The appropriate applicator is to be selected depending on the application medium. The application medium is applied, for example, to a facade of a building or to the building shell and/or to window surfaces. However, the object may also be a physical structure other than a building, for example monuments, bridges, aircraft, ships or the like.

As an alternative or preferably in addition, the work drone comprises at least one sensor for detecting at least one property of the object and/or the environment of the work drone. Here, the sensor may be designed, in particular, for detecting the shape and the type of surface of the object. As an alternative or preferably in addition, a sensor for detecting at least one property of the object and/or the environment of the work drone can be arranged on the auxiliary drone and/or the further drone. As an alternative or in addition, the environment of the work drone can be monitored by means of the sensor, so that, for example, a collision with trees or with further drones can be avoided. In addition, the environmental conditions, in particular temperature, wind speed, wind direction and/or atmospheric humidity, can also be ascertained.

In a preferred embodiment, the supply line is a transport line for the application medium or an auxiliary medium, the transport line being connected to the applicator. The applicator is permanently supplied with the application medium or the auxiliary medium by the transport line, so that, for example, it is possible to dispense with fitting tanks for the application medium or the auxiliary medium. As a result, the work effort by the work drone can be extended in terms of time and the maneuverability can be improved. The auxiliary medium may be, for example, compressed air or water, which can be used for distributing, in particular spraying, the application medium.

In a preferred embodiment, at least one sensor and/or a means for monitoring an environment of the auxiliary drone, in particular of the work drone, is arranged on the auxiliary drone. Monitoring means can also be arranged on the auxiliary drone, so that a further, third drone is not necessarily required for monitoring the performance of the work and work effort by the work drone. It is also easier to identify obstacles since the auxiliary drone can monitor a considerably larger region than the work drone on account of the distance from the object.

In a further advantageous embodiment of the invention, the monitoring means are designed for monitoring a work trajectory of the work drone and/or auxiliary drone and/or of the further drone. In particular, the movements and working sequences can be detected and checked. The work trajectory can have been set in advance, for example if the process had been simulated or tested in advance. In addition, it is necessary for certain applications for a special pattern to be flown by means of the work drone during application in order to ensure cleaner application of the application medium.

The drone network advantageously comprises at least two work drones, an auxiliary drone being assigned to each work drone and/or at least two work drones being assigned to one auxiliary drone. The work drones can be designed, in particular, for performing different work by way of being equipped, for example, for two different work steps.

When assigning a work drone to an auxiliary drone, the individual work drones can move more freely and are not restricted, for example in terms of their movement radius, by the further work drone.

When assigning two or more work drones to one auxiliary drone, the auxiliary drone can be designed in such a way that it receives separate, in particular identical or different, supply lines for the individual work drones or that, when supplying work drones with the same medium, the supply line has a branch to the auxiliary drone, the branch then leading to the work drone. This is particularly advantageous if work drones require the same medium or if the supply line is, for example, a power line.

The drone network can preferably comprise more than one further drone. For example, the further drones can each be equipped for special purposes and/or with special sensors and in particular used only as required.

According to a further preferred embodiment, the drone network comprises a plurality of supply lines, all of the supply lines being guided via the auxiliary drone.

As an alternative, at least two supply lines can be guided via the auxiliary drone. The at least two supply lines are preferably different supply lines, in particular a power line and a transport line.

As a further alternative, an auxiliary drone can also be assigned to each supply line. The corresponding configuration depends on the length of the supply line and the number of supply lines. In particular, different supply lines can be guided via separate auxiliary drones, so that when a medium is no longer required, the supply line for this medium can be disconnected from the work drone and the corresponding auxiliary drone can be removed.

A guide for the supply line is preferably arranged on the auxiliary drone, the guide comprising a device for adjusting a length of the supply line between the work drone and the auxiliary drone. The guide ensures the supply line is received more securely and in particular without kinks. In addition, the guide allows active adjustment of the length of the supply line between the work drone and the auxiliary drone, so that the supply line is not placed under strain and possibly breaking away.

In an advantageous development of the drone network, a distance between the work drone and the auxiliary drone is fixed or variably adjustable. In particular, the length of the supply line between the work drone and the auxiliary drone is adjustable. If required, the distance between the work drone and the auxiliary drone can be adjusted and adapted to the environmental conditions. In particular, the work drone can be moved further away from the auxiliary drone in order to prevent, for example, influencing of the rotors or swirling effects when applying an application medium with the applicator of the work drone. However, it is advantageous here to keep the distance between the work drone and the auxiliary drone and also the length of the supply line as small as possible in order to minimize the tensile loading on the work drone by the supply line between the work drone and the auxiliary drone.

The distance between the work drone and the auxiliary drone preferably lies substantially in the region of three times the rotor-to-rotor distance of the work drone or the auxiliary drone. The rotor-to-rotor distance is determined by a distance between the centers of gravity of two rotors of the work drone or the auxiliary drone. In particular, the rotor-to-rotor distance can be the distance of the centers of gravity of two adjacent rotors or two diametrically opposite rotors.

The minimum distance between the work drone and the auxiliary drone is preferably set or specified. For example, in particular, influencing of the two drones, in particular by their rotors, can be avoided. The minimum distance is preferably at least the rotor-to-rotor distance, particularly preferably 1.5 times the rotor-to-rotor distance. The distance between the work drone and the auxiliary drone is preferably selected such that the length of the supply line between the work drone and the auxiliary drone substantially corresponds to the distance. It is particularly advantageous for the length of the supply line between the work drone and the auxiliary drone to not differ from the distance by more than 1 m.

In a preferred embodiment, a distance between the further drone and the work drone and/or the auxiliary drone can also be fixed or variably adjustable. In particular, a minimum distance between the further drone and the work drone and/or the auxiliary drone can also be set or specified. Here, the choice of the distances and the associated conditions are identical to those for the distance or the minimum distance between the work drone and the auxiliary drone.

During operation, the work drone and/or the auxiliary drone and/or the further drone are preferably arranged such that they substantially do not mutually influence each other's rotors. In particular, the work drone and the auxiliary drone and/or the further drone can be arranged substantially at the same level.

An advantageous embodiment is distinguished in that the work drone and the auxiliary drone and/or the further drone are connected to each other via a control device, and in particular have a device for wirelessly communicating with each other. A movement of the work drone and the auxiliary drone and the further drone are preferably coupled to each other during operation. The work drone and auxiliary drone and the further drone can therefore be coordinated with each other since movements of the work drone, owing to the connection via the supply line, can have an influence on the position or movement of the auxiliary drone, and vice versa. It is also necessary for the work drone and the auxiliary drone to be controlled by means of the control device such that there is no tension on the supply line between the work drone and the auxiliary drone, in order to prevent the supply line from breaking away. The further drone should also be coordinated such that it can perform corresponding monitoring of the work drone and/or auxiliary drone.

As an alternative or preferably in addition, the work drone and the auxiliary drone and/or the further drone are individually controllable. It is particularly advantageous for the work drone and the auxiliary drone and the further drone to be autonomously controllable. The auxiliary drone and in particular the work drone and the further drone can therefore be moved in a targeted manner in order to dispense, for example, an application medium on an object at a specific point. It may be necessary here for the work drone to move freely in relation to the auxiliary drone in order to assume a correct position for application or for checking the object.

In particular, the control device is designed to keep the work drone and the auxiliary drone at the fixed distance from each other by means of data from the further, third drone.

The object is further achieved by a system comprising a drone network as presented above and a base station, the supply line being connected to the base station. In addition to the drone network, the system also comprises a base station, which is operatively connected to the supply line and supplies the supply line. The base station therefore forms a starting point for supplying the supply line with a medium and/or power and/or data.

The base station can preferably comprise storage containers for the medium, in particular the application medium, pump systems for pumping the medium in the supply line to the work drone, mixing devices for the medium and the like. As an alternative or preferably in addition, the base station also comprises a generator for generating power or is designed to be connectable to the power grid.

In particular, the base station can be designed as a mobile unit, which can be moved to the respective site of use. As an alternative, the base can also be arranged in a stationary manner on an object, in particular on a building.

An advantageous refinement is distinguished in that the base station comprises an unrolling device for the at least one supply line, the supply line being guided via the unrolling device. Secure unrolling and rolling up of the supply line are ensured via the unrolling device, so that the supply line is in particular free of kinks or other impairments on the unrolling apparatus since these could otherwise disrupt or even prevent the supply via the supply line. In addition, the supply lines, which can have a length of over 100 m, can be handled and transported more easily.

An unrolling device is preferably assigned to each supply line or a plurality of supply lines are preferably guided via the unrolling device. By separate assignment of individual lines for each unrolling device, these lines can be unrolled in accordance with the respective requirements, in particular if the lines are not identical supply lines.

The unrolling device is preferably configured to release or roll up a length of the supply line depending on the position of the auxiliary drone and possibly the work drone. The unrolling device can be of passive design, as a result of which the auxiliary drone, owing to its movement, pulls along a length of supply line. However, this passive design of the unrolling device is substantially possible when a length of supply line is released. The unrolling device is advantageously an active unrolling device, which releases or can roll up a length of supply line in a controlled manner. Therefore, it is possible to ensure that the supply line is rolled up again on the unrolling device. In addition, the auxiliary drone is relieved of loading since it can pull on the supply line with lower force as it climbs.

In a preferred embodiment, the system further comprises a control device for controlling the work drone, the auxiliary drone, the further drone and/or the base station, in particular the unrolling device. The entire system comprising the drone network with a work drone, an auxiliary drone and possibly further drones and a base station can be uniformly controlled via the control device in order to quickly and efficiently complete corresponding work on an object. In particular, data relating to a flight trajectory of the work drone and/or auxiliary drone and/or the further drone can also be stored in the control device, this data having been ascertained for example in advance in a simulation or based on empirical data.

At least one base station is preferably arranged in a stationary manner. In particular, the base station can be arranged on an object, preferably on a building, preferably at a level above the ground. Stationary arrangement of the base station is particularly advantageous in the case of recurrent, identical uses of a drone network on an object since in this case only the work drones and the auxiliary drone have to be provided for a corresponding use. Even in the case of very high objects or buildings, a base station at a specific level may be advantageous since the entire object or building can be treated by the drone network via this base station.

The system advantageously comprises a plurality of base stations. The base stations are preferably arranged at a base-to-base distance on the object, in particular on the building. As an alternative or preferably in addition, a base station is arranged on each side of the object, in particular on each side of the building. Therefore, correspondingly large objects can be treated by means of the drone network.

The base station can preferably provide only a basic supply with supply lines, for example with supply lines for power and data. In addition, further, in particular mobile, base stations which ensure supply of the supply lines with a corresponding medium, for example the application medium, can then be provided depending on the respective work task and intended application.

The movement of the work drone and the auxiliary drone is preferably controlled such that it follows a specified, in particular optimized, flight plan. The flight path or flight trajectory can have been simulated in advance or based on empirical data and correspondingly stored in the control device. A corresponding flight path ensures, in particular when applying an application medium, that the application medium is applied and dispensed in line with the spatial requirements. As a result, the desired work results and requirements can be reliably met.

BRIEF DESCRIPTION OF THE DRAWINGS

Advantages of the invention are explained below with reference to exemplary embodiments and the figures, in which.

DETAILED DESCRIPTION

Figure 1:
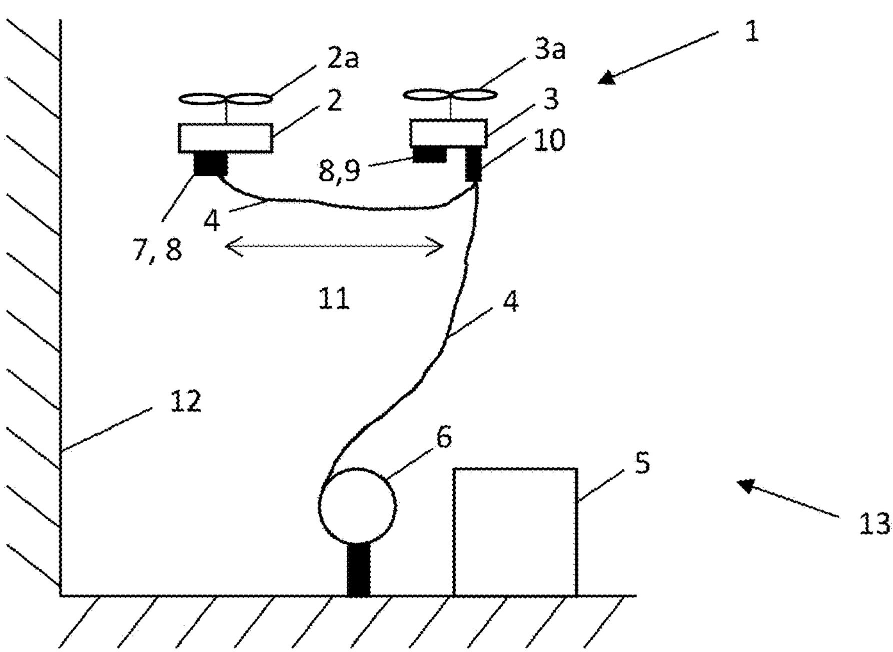
FIG. 1 shows a drone network comprising a work drone and an auxiliary drone.

FIG. 1 shows an exemplary embodiment of a drone network 1 comprising a work drone 2 and an auxiliary drone 3 in a system 13.

The drone network 1 comprises a work drone 2 and an auxiliary drone 3, both of which are located substantially at the same level above the ground. A supply line 4 runs from the work drone 2, via the auxiliary drone 3, to a base station 5, which is located on the ground.

In the present case, the supply line 4 is designed to supply an application medium to an applicator 7, which is arranged on the work drone 2 below the rotor plane formed by the rotors 2*a*. Longer operation of the work drone 2 can be ensured by the application medium being directly supplied to the applicator 7. In the present applications, the transport load, to which the application medium makes a substantial contribution, is often a limiting factor. In addition, the application medium on the work drone 2 is used up during operation, as a result of which the center of gravity of the work drone changes if the application medium is arranged directly on the work drone 2, for example by means of a cartridge or a tank. Both of these disadvantages are avoided owing to supply via the supply line 4.

In addition to supply with an application medium, the work drone 2 can also be supplied with electrical energy via the supply line 4 or a further supply line 4, as a result of which the usage duration of the work drone 2 is further increased.

The work drone 2 is located in the vicinity of an object 12, which is formed by a wall of a building in the present case. However, the object 12 may also be another physical object, for example a bridge, or a technical installation. In addition to the applicator 7, the work drone 2 further comprises a sensor 8, which is likewise arranged on the work drone 2 below the rotor plane. In particular, the object 12 should be detected with the sensor 8 and the application process should be followed. The sensor is, for example, a camera.

The auxiliary drone 3 is located at a lateral distance 11 from the work drone 2 in order to prevent a collision and mutual influencing, in particular by swirling effects of the rotors 2*a*, 3*a* of the work drone 2 and auxiliary drone 3. The supply line 4 between the work drone 2 and the auxiliary drone 3 is designed to be somewhat longer than the distance 11, so that the supply line in particular sags slightly. This prevents direct loading on the work drone with a tensile loading. In addition, the work drone 2 can then move more freely and has greater freedom of movement since the auxiliary drone 3 does not have to be immediately adjusted with each movement of the work drone 2.

A guide 10 is further arranged on the auxiliary drone 3, the supply line 4 being guided to the base station 5 via the guide and strain relief of the work drone 2 by the supply line 4 substantially being ensured via the guide. The guide 10 may be a passive guide, in which the supply line 4 is merely received and possibly secured. Therefore, the load and strain relief by the supply line takes place directly on the auxiliary drone 3. As an alternative, the guide may be an active guide 10, which is of motorized design in order to accordingly adjust the length of the supply line 4 in relation to the base station 5 and at a distance 11 between the work drone 2 and the auxiliary drone 3. In the present case, the guide 10 is fixedly arranged on the auxiliary drone 3, but alternatively can also be arranged movably on the auxiliary drone 3.

In the present case, the auxiliary drone 3 further comprises at least one sensor 8 and monitoring means 9. In the present case, the monitoring means 9 is a camera, which detects the activities of the work drone 2.

The at least one supply line 4 leads from the work drone 2, via the auxiliary drone 3, to the base station 5. By way of example, tanks are arranged on the base station 5, the application medium being stored in the tanks and then being pumped or conveyed via the supply line 4 to the applicator 7 on the work drone 2 depending on the consumption. Energy supply to the work drone 2 and the auxiliary drone 3 via a power line as the supply line 4 can also be ensured at the base station.

The base station 5 can be of stationary design and in particular can be part of an object, in particular a building, for example for cleaning the facade of the building. Therefore, cleaning operations can be regularly carried out on the building. As an alternative, the base station 5 can also be of mobile configuration and therefore be moved to the respective site of use. As a result, the work drone 2 can be used in a flexible manner since the base station 5 can be moved to the respective site of use.

In order to ensure corresponding climbing by the work drone 2 and auxiliary drone 3, the supply line 4 has a certain, maximum length. For improved coordination, the supply line 4 is wound up on an unrolling station 6 and can be unwound or wound up in line with the work drone 2 and auxiliary drone 3 climbing or descending. This ensures reliable guidance of the supply line 4. The unrolling device 6 can have, in particular, a motor, by means of which a length of the supply line 4 is released, without the auxiliary drone 3 having to be actively pulled. This further reduces the tensile loading on the auxiliary drone 3.

Figure 2:
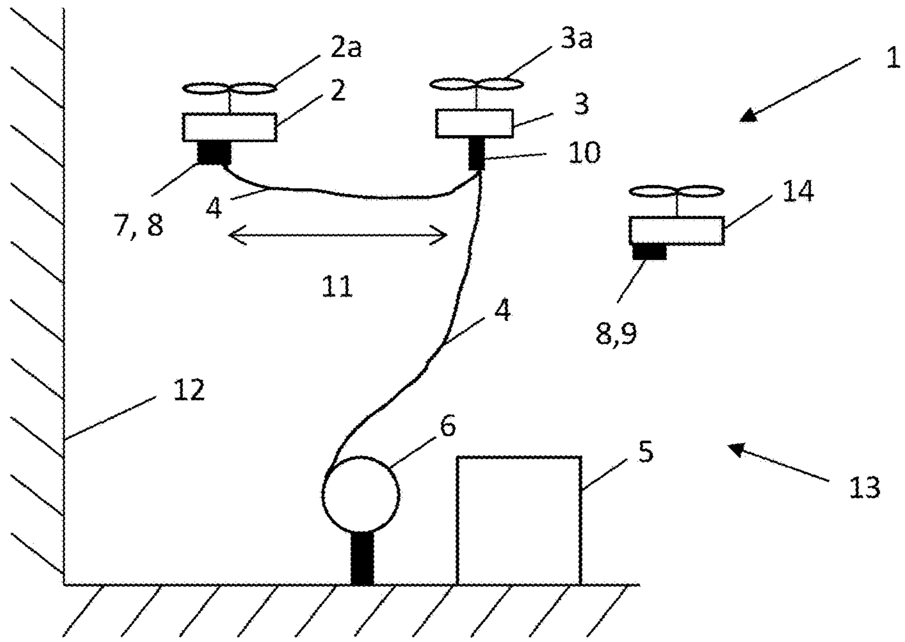
FIG. 2 shows a drone network according to the invention comprising at least three drones.

FIG. 2 shows an embodiment according to the invention of the drone network 1, which comprises a total of three drones. Analogously to FIG. 1, the drone network 1 according to FIG. 2 likewise comprises a work drone 2 and an auxiliary drone 3, which are connected to a base station 5 via the one supply line 4. The supply line 4 is once again guided via the auxiliary drone 3 for better maneuverability of the work drone 2 and for strain relief on the work drone 2 via the auxiliary drone 3. Furthermore, the drone network according to FIG. 2 comprises a further, third drone 14, which serves to monitor the work drone 2 and the auxiliary drone 3. The further, third drone 14 is not linked to the supply line 4 and therefore can be moved and controlled independently of the work drone 2 and the auxiliary drone 3 in the drone network 1.

In the present case, the further drone 14 comprises sensors 8 and means 9 for monitoring the work drone 2 and the auxiliary drone 3. In particular, the further drone 14 can also take accurate recordings of the manner of operation and work results of the work drone 2 on the object 12, so that the work processes can be comprehensively documented at the same time. In contrast to FIG. 1, no monitoring means 9, but rather only sensors 8 which detect for example undershooting of a minimum distance for the distance 11 between the work drone 2 and the auxiliary drone 3, are arranged on the auxiliary drone 3 when using a further work drone 14.

The entire system 13 comprising the drone network 1 with a work drone 2, an auxiliary drone 3 and a further drone 14 and the base station 5 with an unrolling device 6 is operatively connected via a common control device. The work drone 2 and the auxiliary drone 3 are guided on corresponding flight paths or flight trajectories, which are stored in the control device and are based, for example, on empirical values or simulations. As an alternative, the work drone 2 and auxiliary drone 3 can also be controlled manually by an operator, the work drones 2 and the auxiliary drone 3 being coupled to each other. However, as a further alternative, the work drone 2 and auxiliary drone 3 can also be controlled separately, for example by two operators. The further drone 14 can be autonomous of a common movement of the work drone 2 and auxiliary drone 3, as a result of which these can carry out corresponding monitoring flexibly or make recordings of the work carried out. The signals and information from the sensors 8 and the monitoring means 9 are also combined in the control device in order to, for example, emit a warning signal when a minimum distance for the distance 11 between the work drone 2 and the auxiliary drone 3 is undershot or to initiate evasive maneuvers.

List of reference signs

| | |
|---|---|
| 1 | Drone network |
| 2 | Work drone |
| 2a | Rotor |
| 3 | Auxiliary drone |
| 3a | Rotor |
| 4 | Supply line |
| 5 | Base station |
| 6 | Unrolling device |
| 7 | Applicator |
| 8 | Sensor |
| 9 | Monitoring means |
| 10 | Guide |
| 11 | Distance |
| 12 | Object |
| 13 | System |
| 14 | Drone |

The invention claimed is:

1. A drone network (1) comprising:

at least one work drone (2), the at least one work drone (2) being adapted to perform activities in an environment and being connected to a base station (5) via a supply line (4);

at least one auxiliary drone (3), the supply line (4) being guided to the at least one work drone (2) via the at least one auxiliary drone (3); and a further drone (14) that is untethered from the supply line (4) and is independently movable relative to the at least one work drone (2) and the at least one auxiliary drone (3), the further drone (14) comprising at least one of sensors (8) or means (9) for monitoring at least one of the at least one work drone (2) or the at least one auxiliary drone (3) and/or means (9) for monitoring the environment of at least one of the at least one work drone (2) or the at least one auxiliary drone (3).

2. The drone network (1) as claimed in claim 1, wherein there are at least two of the work drones (2) and at least two of the auxiliary drones (3), with one of the auxiliary drones (3) being assigned to each respective one of the work drones (2), or at least two of the work drones (2) are assigned to each of the auxiliary drones (3).

3. The drone network (1) as claimed in claim 1, wherein there are a plurality of the supply lines (4), all of the supply lines (4) being guided via the at least one auxiliary drone (3) or at least two of the supply lines (4) being guided via the at least one auxiliary drone (3) or one said auxiliary drone (3) being assigned to each said supply line (4).

4. The drone network (1) as claimed in claim 1, wherein a guide (10) for the supply line (4) is arranged on the at least one auxiliary drone (3), the guide (10) having a device for adjusting a length of the supply line (4) between the at least one work drone (2) and the at least one auxiliary drone (3).

5. The drone network (1) as claimed in claim 1, wherein, during operation, the at least one work drone (2), the at least one auxiliary drone (3), and/or the further drone (14) are arranged such respective rotors (2*a*, 3*a*) of the at least one work drone (2), the at least one auxiliary drone (3), and the further drone (14) do not substantially influence one another.

6. The drone network (1) as claimed in claim 1, wherein the at least one work drone (2) is substantially free of tensile loading by the supply line or by a weight force of the supply line (4).

7. The drone network (1) as claimed in claim 6, wherein the supply line (4) is at least one of a power line, a data line, or transport line for a medium.

8. The drone network (1) as claimed in claim 1, wherein the at least one work drone (2) comprises at least one applicator (7) for applying an application medium to an object (12), and the work drone (2) comprises at least one sensor (8) for detecting at least one of a property of an object (12) or the environment of the work drone (2).

9. The drone network (1) as claimed in claim 8, wherein the supply line (4) is a transport line for the application medium or an auxiliary medium, and the transport line is connected to the applicator (7).

10. The drone network (1) as claimed in claim 1, further comprising at least one of a sensor (8) or means (9) for monitoring an environment of the at least one auxiliary drone (3) arranged on the auxiliary drone (3).

11. The drone network (1) as claimed in claim 10, wherein the at least one of the sensor (8) or the means (9) for monitoring the environment of the at least one auxiliary drone (3) are designed for monitoring a work trajectory of at least one of the at least one work drone (2), the at least one auxiliary drone (3), or the further drone (14).

12. The drone network (1) as claimed in claim 1, wherein a distance (11) between the at least one work drone (2) and the at least one auxiliary drone (3) is fixed or is variably adjustable, and a length of the supply line (4) between the at least one work drone (2) and the at least one auxiliary drone (3) is adjustable.

13. The drone network (1) as claimed in claim 12, wherein a minimum distance between the at least one work drone (2) and the at least one auxiliary drone (3) is specified, and the distance (11) between the at least one work drone (2) and the at least one auxiliary drone (3) is selected such that the length of the supply line (4) between the work drone (2) and the auxiliary drone (3) substantially corresponds to the distance (11) and does not differ from the distance (11) by more than 1 m.

14. The drone network (1) as claimed in claim 1, wherein the at least one work drone (2) and the at least one auxiliary drone (3) and/or the further drone (14) are wirelessly connected to each other via a controller.

15. The drone network (1) as claimed in claim 14, wherein a movement of the at least one work drone (2) and the at least one auxiliary drone (3) and/or the further drone (14) are coupled to each other during operation, and the at least one work drone (2) and the at least one auxiliary drone (3) and the further drone (14) are individually controllable.

16. A system (13) comprising:

a drone network (1) as claimed in claim 1 and a base station (5), the supply line (4) being connected to the base station (5).

17. The system (13) as claimed in claim 16, wherein the base station (5) comprises an unrolling device (6) for the supply line (4), the supply line (4) being guided via the unrolling device, and the unrolling device (6) is configured to release or roll up a length of the supply line (4) depending on a position of at least one of the at least one auxiliary drone (3) or the at least one work drone (2).

18. The system (13) as claimed in claim 16, further comprising a controller for controlling at least one of the at least one work drone (2), the at least one auxiliary drone (3), the further drone (14), or the base station (5).

19. The system (13) as claimed in claim 16, wherein the at least one base station (5) is arranged in a stationary manner.

20. The system (13) as claimed in claim 19, wherein there are a plurality of the base stations (5), and the base stations (5) are arranged at a base-to-base distance on an object (12), and/or the base stations (5) are arranged on each side of the object (12).

* * * * *